US012630134B2

(12) United States Patent
You et al.

(10) Patent No.: US 12,630,134 B2
(45) Date of Patent: May 19, 2026

(54) BRAKING CONTROL APPARATUS FOR VEHICLE AND METHOD THEREOF

(71) Applicants:Hyundai Motor Company, Seoul (KR); Kia Corporation, Seoul (KR); HL Mando Corporation, Pyeongtaek (KR)

(72) Inventors: Na On You, Seoul (KR); Kwon Kee Moon, Seongnam (KR); Dong Il Seo, Seongnam (KR)

(73) Assignees: Hyundai Motor Company, Seoul (KR); Kia Corporation, Seoul (KR); HL Mando Corporation, Pyeongtaek (KR)

( * ) Notice: Subject to any disclaimer, the term of this patent is extended or adjusted under 35 U.S.C. 154(b) by 210 days.

(21) Appl. No.: 18/530,962

(22) Filed: Dec. 6, 2023

(65) Prior Publication Data

US 2025/0065854 A1 Feb. 27, 2025

(30) Foreign Application Priority Data

Aug. 22, 2023 (KR) ........................ 10-2023-0110147

(51) Int. Cl.
B60L 7/18 (2006.01)
B60T 8/88 (2006.01)
(Continued)

(52) U.S. Cl.
CPC ................ B60T 8/885 (2013.01); B60L 7/18 (2013.01); B60T 8/92 (2013.01); B60T 13/586 (2013.01);
(Continued)

(58) Field of Classification Search
CPC .......... B60T 8/885; B60T 8/92; B60T 17/221; B60T 1/10; B60T 13/12; B60T 13/58;
(Continued)

(56) References Cited

U.S. PATENT DOCUMENTS

2013/0125638 A1* 5/2013 Miyazaki ................ B60T 17/22
73/132
2021/0362699 A1* 11/2021 Landers ................ B60T 8/1761
(Continued)

FOREIGN PATENT DOCUMENTS

EP 3741634 A1 * 11/2020 ............ B60T 13/745
KR 10-2019-0143588 A 12/2019
(Continued)

*Primary Examiner* — Calvin Cheung
(74) *Attorney, Agent, or Firm* — Fox Rothschild LLP

(57) ABSTRACT

A braking control apparatus includes a first controller that brakes a vehicle depending on an output signal generated by a first pedal stroke sensor according to a stroke of a brake pedal, a second controller that brakes the vehicle depending on an output signal generated by a second pedal stroke sensor, a third controller that calculates a regenerative brake torque for regenerative braking of the vehicle and brakes the vehicle, and an electric parking brake (EPB) that generates a parking braking force of the vehicle. Any one of the first controller, the second controller, or the third controller controls the regenerative braking or the parking braking force to brake the vehicle, depending on whether at least one of the first controller or the second controller is in a normal state.

18 Claims, 8 Drawing Sheets

(51) Int. Cl.
    *B60T 8/92*           (2006.01)
    *B60T 13/58*         (2006.01)
    *B60T 17/22*         (2006.01)

(52) U.S. Cl.
    CPC ........... *B60T 17/22* (2013.01); *B60T 2220/04*
             (2013.01); *B60T 2250/04* (2013.01); *B60T*
                             *2270/413* (2013.01)

(58) Field of Classification Search
    CPC ...... B60T 13/586; B60T 13/662; B60T 13/74;
                 B60T 17/22; B60T 2220/04; B60T
                 2250/04; B60T 2270/402; B60T
            2270/413; B60T 2270/60; B60L 7/18;
               B60L 7/26; B60L 2250/26; B60Y
          2306/13; B60Y 2306/15; B60Y 2400/81
    See application file for complete search history.

(56)                References Cited

U.S. PATENT DOCUMENTS

2021/0380088 A1 * 12/2021  Yoo ......................... B60T 13/74
2023/0192048 A1 * 6/2023  Moon ...................... B60T 1/10
                                        701/22

FOREIGN PATENT DOCUMENTS

KR     10-2020-0140752 A    12/2020
KR     10-2020-0140753 A    12/2020
KR     10-2020-0140754 A    12/2020
KR     10-2022-0058470 A     5/2022

* cited by examiner

| FAULT TYPE | no | FIRST CONTROLLER | SECOND CONTROLLER | EPB SYSTEM | PASS#1 SENSOR | PASS#2 SENSOR | CONTROL AUTHORITY ENTITY | CONTROL CONCEPT |
|---|---|---|---|---|---|---|---|---|
| NORMAL STATE | 1 | ○ | ○ | ○ | ○ | ○ | FIRST CONTROLLER | THE FIRST CONTROLLER RECOGNIZES THE SIGNAL OF PSS#1 SENSOR AND PERFORMS THE BRAKING FUNCTION. |
| FAULT IN SENSOR | 2 | ○ | ○ | ○ | × | ○ | SECOND CONTROLLER | THE SECOND CONTROLLER RECOGNIZES THE SIGNAL OF PSS#2 SENSOR AND PERFORMS THE BRAKING FUNCTION. |
| | 3 | ○ | ○ | ○ | ○ | × | FIRST CONTROLLER | THE FIRST CONTROLLER RECOGNIZES THE SIGNAL OF PSS#1 SENSOR AND PERFORMS THE BRAKING FUNCTION. |
| | 4 | ○ | ○ | ○ | × | × | FIRST CONTROLLER | THE FIRST CONTROLLER OPERATES THE REGENERATIVE BRAKING SYSTEM AND THE EPB SYSTEM TO PERFORM VEHICLE EMERGENCY BRAKING. |
| | 5 | ○ | ○ | ○ | PSS#1 AND PSS#2 SIGNALS ARE DIFFERENT FROM EACH OTHER. | PSS#1 AND PSS#2 SIGNALS ARE DIFFERENT FROM EACH OTHER. | FIRST CONTROLLER | THE FIRST CONTROLLER RECOGNIZES THE SIGNAL OF PSS#1 SENSOR AND PERFORMS THE BRAKING FUNCTION. |
| FAULT IN FIRST CONTROLLER | 6 | × | ○ | ○ | ○/× | ○ | SECOND CONTROLLER | THE SECOND CONTROLLER RECOGNIZES THE SIGNAL OF PSS#2 SENSOR AND PERFORMS THE BRAKING FUNCTION. |
| FAULT IN SECOND CONTROLLER | 7 | ○ | × | ○ | ○ | ○/× | FIRST CONTROLLER | THE FIRST CONTROLLER RECOGNIZES THE SIGNAL OF PSS#1 SENSOR AND PERFORMS THE BRAKING FUNCTION. |
| FAULT IN PSS#1 SENSOR + FAULT IN FIRST CONTROLLER | 8 | × | ○ | ○ | × | ○ | SECOND CONTROLLER | THE SECOND CONTROLLER RECOGNIZES THE SIGNAL OF PSS#2 SENSOR AND PERFORMS THE BRAKING FUNCTION. |
| FAULT IN PSS#1 SENSOR + FAULT IN SECOND CONTROLLER | 9 | ○ | × | ○ | × | ○ | FIRST CONTROLLER | THE FIRST CONTROLLER OPERATES THE REGENERATIVE BRAKING SYSTEM AND THE EPB SYSTEM TO PERFORM VEHICLE EMERGENCY BRAKING. |
| FAULT IN PSS#2 SENSOR + FAULT IN SECOND CONTROLLER | 10 | ○ | × | ○ | ○ | × | FIRST CONTROLLER | THE FIRST CONTROLLER RECOGNIZES THE SIGNAL OF PSS#1 SENSOR AND PERFORMS THE BRAKING FUNCTION. |
| FAULT IN PSS#2 SENSOR + FAULT IN FIRST CONTROLLER | 11 | × | ○ | ○ | ○ | × | SECOND CONTROLLER | THE SECOND CONTROLLER OPERATES THE REGENERATIVE BRAKING SYSTEM AND THE EPB SYSTEM TO PERFORM VEHICLE EMERGENCY BRAKING. |
| FAULT IN FIRST CONTROLLER + FAULT IN SECOND CONTROLLER | 12 | × | × | ○ | ○/× | ○/× | THIRD CONTROLLER | THE THIRD CONTROLLER OPERATES THE REGENERATIVE BRAKING SYSTEM AND THE EPB SYSTEM TO PERFORM VEHICLE EMERGENCY BRAKING. |
| FAULT IN FIRST CONTROLLER + FAULT IN SECOND CONTROLLER + FAULT IN EPB SYSTEM | 13 | × | × | × | ○/× | ○/× | THIRD CONTROLLER | THE THIRD CONTROLLER OPERATES THE REGENERATIVE BRAKING SYSTEM TO PERFORM VEHICLE EMERGENCY BRAKING. |

FIG 7

BRAKING CONTROL APPARATUS FOR VEHICLE AND METHOD THEREOF

CROSS-REFERENCE TO RELATED APPLICATION

This application claims under 35 U.S.C. § 119(a) the benefit of Korean Patent Application No. 10-2023-0110147, filed in the Korean Intellectual Property Office on Aug. 22, 2023, the entire contents of which are incorporated herein by reference.

BACKGROUND

(a) Technical Field

The present disclosure relates to a braking control apparatus for a vehicle and a method thereof, more particularly, to the braking control apparatus and method in which backup braking is provided by utilizing an electric parking brake (EPB) to supplement braking or to provide redundancy in the event of failure of at least one braking component.

(b) Description of the Related Art

Braking technology in a vehicle may detect manipulation of the brake pedal using a sensor and control at least one controller to generate an optimal braking force in the vehicle. Such technology replaces a complex hydraulic or pneumatic braking system from the driver's seat to all wheels of the vehicle by wires, and thus may be advantageous in terms of weight reduction and improved fuel efficiency, so its potential for use is highly anticipated.

However, the braking technology in the vehicle typically includes a controller, such as a processor, and electronic parts, such as a brake pedal sensor. There is a need for a fail-safe function to safely brake the vehicle even when faults occur in one or more components.

To address such a problem, when a fault occurs in a controller which perform hydraulic braking, there is a need to develop an efficient fail-safe technology linked with regenerative braking and an electric parking brake (EPB).

SUMMARY

An aspect of the present disclosure provides a braking control apparatus for implementing a dynamic brake using regenerative braking and electric parking brake (EPB) control to supplement insufficient braking by the amount of braking of the EPB even when target brake pressure of a driver is greater than a regenerative brake torque to increase driving convenience and safety of the vehicle passenger by braking of the EPB in a regenerative braking fadeout section just before standstill of a vehicle.

Another aspect of the present disclosure provides a braking control apparatus for configuring a braking redundancy system to perform braking by the remaining controllers except for a controller in which a fault occurs in an emergency situation in which braking is required to increase efficiency and safety and a method thereof.

Another aspect of the present disclosure provides a braking control apparatus for performing control by a third controller as a double fault occurs in a backup controller (e.g., a rear control unit (RCU)) as well as a main braking controller (e.g., an integrated electronic brake (IEB)) to more improve the sense of braking than when performing backup braking using only an EPB and stably decelerate and stop the vehicle and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a braking control apparatus may include a first controller that brakes a vehicle depending on an output signal generated by a first pedal stroke sensor according to a stroke of a brake pedal, a second controller that brakes the vehicle depending on an output signal generated by a second pedal stroke sensor different from the first pedal stroke sensor connected with the first controller, a third controller that calculates a regenerative brake torque for regenerative braking of the vehicle and brakes the vehicle, and an electric parking brake (EPB) that generates a parking braking force of the vehicle by an electrical signal. Any one of the first controller, the second controller, or the third controller may control at least one of the regenerative braking or the parking braking force, to brake the vehicle, depending on whether at least one of the first controller or the second controller, is in a normal state.

In an embodiment, the first controller may apply an output signal of the second controller and an output signal of the first controller to at least one of a start-up self-test (SUST), a shut-down self-test (SDST), or fault detection logic, to determine the normal state of the first controller and may transmit a state of the first controller to the third controller, when the state of the first controller is not the normal state. The second controller may apply the output signal of the first controller and the output signal of the second controller to the at least one of the SUST, the SDST, or the fault detection logic to determine the normal state of the second controller and may transmit a state of the second controller to the third controller, when the state of the second controller is not the normal state. The normal state may indicate whether the at least one of the first controller or the second controller is able to perform hydraulic control of the vehicle.

In an embodiment, the third controller may obtain a first torque at a target time point, in a torque area in which regenerative braking is possible for each vehicle speed, in a motor for driving the vehicle, may obtain a second torque for an amount of target braking from at least one of target brake pressure or a driving controller, may obtain a third torque for the target time point, in a torque area in which regenerative braking is possible to a maximum for each vehicle speed, in the motor, and may calculate the smallest torque among the first torque, the second torque, and the third torque as the regenerative brake torque at the target time point.

In an embodiment, the first controller may receive an output signal corresponding to the regenerative brake torque from the third controller, based on that a state of the first controller is the normal state, and may compare target brake pressure with the regenerative brake torque, and may brake the vehicle. The third controller may transmit the output signal corresponding to the regenerative brake torque to the first controller, based on that the state of the first controller is the normal state.

In an embodiment, the first controller may brake the vehicle by regenerative braking of a motor according to the regenerative brake torque and an operation of the EPB, based on that the state of the first controller is the normal state and that there is an error in the output signal of the first pedal stroke sensor.

In an embodiment, the second controller may receive an output signal corresponding to the regenerative brake torque from the third controller, based on that a state of the first controller is not the normal state and that a state of the second controller is the normal state, and may compare target brake pressure with the regenerative brake torque and may brake the vehicle. The third controller may transmit the output signal corresponding to the regenerative brake torque to the second controller, based on that the state of the first controller is not the normal state and that the state of the second controller is the normal state.

In an embodiment, the second controller may brake the vehicle by regenerative braking of a motor according to the regenerative brake torque and an operation of the EPB, based on that the state of the first controller is not the normal state, that the state of the second controller is the normal state, and that there is an error in the output signal of the second pedal stroke sensor.

In an embodiment, the third controller may compare target brake pressure with the regenerative brake torque and may brake the vehicle, based on that a state of the first controller is not the normal state and that a state of the second controller is not the normal state.

In an embodiment, the third controller may reduce a speed of the vehicle by regenerative braking of a motor according to the regenerative brake torque, based on a controller area network (CAN) state signal received from each of the first controller and the second controller, and may operate the EPB to bring the vehicle to a standstill, when the speed of the vehicle is less than or equal to a predetermined speed.

In an embodiment, at least one of the first controller, the second controller, or the third controller may obtain a state of the EPB, when target brake pressure is greater than the regenerative brake torque, and may brake the vehicle by regenerative braking of a motor according to the regenerative brake torque and an operation of the EPB, when the state of the EPB is normal.

In an embodiment, a vehicle may include the braking control apparatus.

According to another aspect of the present disclosure, a braking control method may include braking, by a first controller, a vehicle depending on an output signal generated by a first pedal stroke sensor according to a stroke of a brake pedal, braking, by a second controller, the vehicle depending on an output signal generated by a second pedal stroke sensor different from the first pedal stroke sensor connected with the first controller, calculating, by a third controller, a regenerative brake torque for regenerative braking of the vehicle and braking, by the third controller, the vehicle, generating, by an electric parking brake (EPB), a parking braking force of the vehicle by an electrical signal, and controlling, by any one of the first controller, the second controller, or the third controller, at least one of the regenerative braking or the parking braking force, to brake the vehicle, depending on whether at least one of the first controller or the second controller, is in a normal state.

In an embodiment, the braking control method may further include applying, by the first controller, an output signal of the second controller and an output signal of the first controller to at least one of a start-up self-test (SUST), a shut-down self-test (SDST), or fault detection logic, to determine the normal state of the first controller, transmitting, by the first controller, a state of the first controller to the third controller, when the state of the first controller is not the normal state, applying, by the second controller, the output signal of the first controller and the output signal of the second controller to the at least one of the SUST, the SDST, or the fault detection logic to determine the normal state of the second controller, and transmitting, by the second controller, a state of the second controller to the third controller, when the state of the second controller is not the normal state. The normal state may indicate whether the at least one of the first controller or the second controller is able to perform hydraulic control of the vehicle.

In an embodiment, the braking control method may further include obtaining, by the third controller, a first torque at a target time point, in a torque area in which regenerative braking is possible for each vehicle speed, in a motor for driving the vehicle, obtaining, by the third controller, a second torque for an amount of target braking from at least one of target brake pressure or a driving controller, obtaining, by the third controller, a third torque at the target time point, in a torque area in which regenerative braking is possible to a maximum for each vehicle speed, in the motor, and calculating, by the third controller, the smallest torque among the first torque, the second torque, and the third torque as the regenerative brake torque at the target time point.

In an embodiment, the braking control method may further include receiving, by the first controller, an output signal corresponding to the regenerative brake torque from the third controller, based on that a state of the first controller is the normal state, comparing, by the first controller, target brake pressure with the regenerative brake torque and braking, by the first controller, the vehicle, and transmitting, by the third controller, the output signal corresponding to the regenerative brake torque to the first controller, based on that the state of the first controller is the normal state.

In an embodiment, the braking of the vehicle may include braking, by the first controller, the vehicle by regenerative braking of a motor according to the regenerative brake torque and an operation of the EPB, based on that the state of the first controller is the normal state and that there is an error in the output signal of the first pedal stroke sensor.

In an embodiment, the braking control method may further include receiving, by the second controller, an output signal corresponding to the regenerative brake torque from the third controller, based on that a state of the first controller is not the normal state and that a state of the second controller is the normal state, comparing, by the second controller, target brake pressure with the regenerative brake torque and braking, by the second controller, the vehicle, and transmitting, by the third controller, the output signal corresponding to the regenerative brake torque to the second controller, based on that the state of the first controller is not the normal state and that the state of the second controller is the normal state.

In an embodiment, the braking of the vehicle may include braking, by the second controller, the vehicle by regenerative braking of a motor according to the regenerative brake torque and an operation of the EPB, based on that the state of the first controller is not the normal state, that the state of the second controller is the normal state, and that there is an error in the output signal of the second pedal stroke sensor.

In an embodiment, the braking control method may further include comparing, by the third controller, target brake pressure with the regenerative brake torque and braking, by the third controller, the vehicle, based on that a state of the first controller is not the normal state and that a state of the second controller is not the normal state.

In an embodiment, the braking of the vehicle may include reducing, by the third controller, a speed of the vehicle by regenerative braking of a motor according to the regenerative brake torque, based on a CAN state signal received from each of the first controller and the second controller, and operating, by the third controller, the EPB to bring the vehicle to a standstill, when the speed of the vehicle is less than or equal to a predetermined speed.

In an embodiment, the braking control method may further include obtaining, by at least one of the first controller, the second controller, or the third controller, a state of the EPB, when target brake pressure is greater than the regenerative brake torque, and braking, by the at least one of the first controller, the second controller, or the third controller, the vehicle by regenerative braking of a motor according to the regenerative brake torque and an operation of the EPB, when the state of the EPB is normal.

BRIEF DESCRIPTION OF THE DRAWINGS

The above and other objects, features and advantages of the present disclosure will be more apparent from the following detailed description taken in conjunction with the accompanying drawings:

FIG. 7 is a drawing illustrating a control table for each fault mode, in a robot control system according to an embodiment of the present disclosure.

Figure 1:
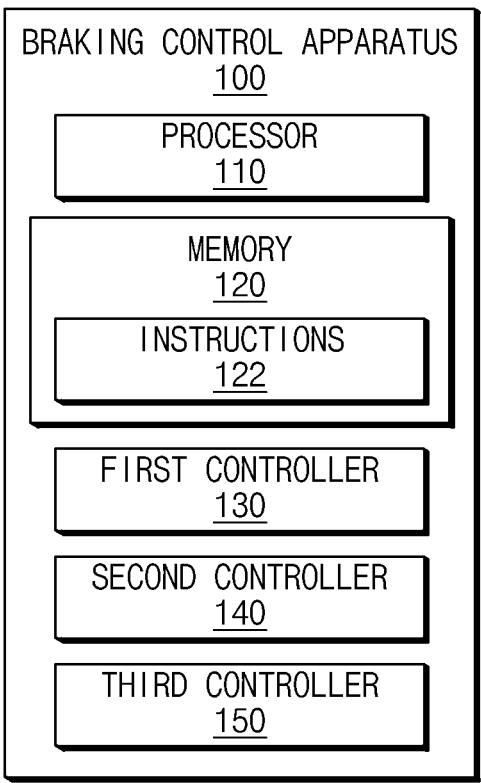
FIG. 1 is a drawing illustrating a braking control apparatus according to an embodiment of the present disclosure.

With regard to description of drawings, the same or similar denotations may be used for the same or similar components.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure. Hereinafter, various embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein. For example, the terms, such as "first", "second", "1st", "2nd", or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

It will be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used interchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. Terms used in the present disclosure are used to only describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person skilled in the art described in the present disclosure. It will be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C" may include any one of, or all possible combinations of the items enumerated together in a corresponding one of the phrases. Particularly, the phrase such as "at least one of A, B, or C" may include "A", "B", or "C", or "AB" or "ABC", which is a combination thereof.

Hereinafter, embodiments of the present disclosure will be described in detail with reference to FIGS. 1 to 8.

FIG. 1 is a drawing illustrating a braking control apparatus according to an embodiment of the present disclosure.

A braking control apparatus 100 according to an embodiment may include a processor 110, a memory 120 including instructions 122, a first controller 130, a second controller 140, and a third controller 150.

The braking control apparatus 100 may indicate a braking control apparatus which has a fail-safe function and implements backup braking in a situation where hydraulic braking fails in a vehicle. For example, the braking control apparatus 100 may be a braking control apparatus which decelerates and stops the vehicle by regenerative braking and backup braking using an electric parking brake (EPB), in a situation where controllers, each of which performs braking using an electro hydraulic brake (EHB), fail.

When a fault occurs in a main braking controller (e.g., an integrated electronic brake (IEB)), the braking control apparatus 100 may perform braking hydraulic control using a backup controller (e.g., a rear control unit (RCU)). For example, the main braking controller (e.g., the IEB) may include the first controller 130 and the second controller 140. When a fault occurs in the main braking controller (e.g., the IEB), the braking control apparatus 100 may decelerate and stop the vehicle, using hydraulic control, regenerative braking control, and EPB control of each wheel, by the backup controller (e.g., the RCU).

As a fault (e.g., a double fault) occurs in the main braking controller (e.g., the IEB) and the backup controller (e.g., the RCU), when both the first controller 130 and the second controller 140 are unable to perform hydraulic control or when hardware (e.g., a motor, a pump or a hydraulic unit) is unable to generate hydraulic pressure, the braking control apparatus 100 may decelerate and stop the vehicle by the third controller 150. For example, the braking control apparatus 100 may decelerate and stop the vehicle, using regenerative braking control and EPB control of each wheel, by the third controller 150.

For reference, an example of the fault in which both the first controller 130 and the second controller 140 are unable to perform the hydraulic control is as follows:

1) A fault in motor stuck (a single fault);
2) A fault in motor overheat protection 2 (a single fault);
3) A fault in solenoid valve of the first controller 130 & a fault in solenoid valve of the second controller 140 (a double fault); and/or
4) A fault in motor position sensor/electrical/initialization/origin set of the first controller 130 (a double fault) & a fault in motor position sensor/electrical/initialization/origin set of the second controller 140 (a double fault).

When faults occur in the main braking controller (e.g., the IEB) and the backup controller (e.g., the RCU) at the same time, the braking control apparatus 100 may decelerate and stop the vehicle by comparing target brake pressure with a regenerative brake torque, by the third controller 150. For example, the regenerative brake torque may be a value calculated by the third controller 150, which will be described in detail below with reference to FIG. 4.

First of all, when the target brake pressure is greater than the regenerative brake torque, the braking control apparatus 100 may brake the vehicle using regenerative braking of the motor according to the regenerative brake torque and an operation of the EPB, by the third controller 150. Next, when the regenerative brake torque is greater than the target brake pressure, the braking control apparatus 100 may brake the vehicle using regenerative braking of the motor according to the regenerative brake torque, by the third controller 150. Finally, when the speed of the vehicle is less than or equal to a predetermined speed (e.g., 3 kph), the braking control apparatus 100 may bring the vehicle to a complete standstill and may maintain the standstill under control the EPB in a regenerative braking fadeout section just before the standstill, for the complete standstill of the vehicle. A detailed description of it will be given below with reference to FIG. 5.

However, it is mainly described in the specification that the braking control apparatus 100 brakes the vehicle by comparing the target brake pressure with the regenerative brake torque by the third controller 150, but not limited thereto. For example, the braking control apparatus 100 may brake the vehicle by comparing the target brake pressure with the regenerative brake torque, by at least one of the first controller 130 or the second controller 140. In this case, the at least one of the first controller 130 or the second controller 140 may receive a regenerative brake torque from the third controller 150. Therefore, the at least one of the first controller 130 or the second controller 140 may brake the vehicle by regenerative braking of the motor according to the regenerative brake torque received from the third controller 150 and an operation of the EPB. A detailed description of it will be given below with reference to FIG. 6.

The processor 110 may execute software and may control at least one other component (e.g., a hardware or software component) connected with the processor 110. In addition, the processor 110 may perform a variety of data processing or calculation. For example, the processor 110 may store a regenerative brake torque, an output signal, a first torque at a target time point, a second torque for an amount of target braking, and a third torque at the target time point in the memory 120. For reference, the processor 110 may perform all operations performed by the braking control apparatus 100. Therefore, for convenience of description in the specification, the operation performed by the braking control apparatus 100 is mainly described as an operation performed by the processor 110. Furthermore, for convenience of description in the specification, the processor 110 is mainly described as, but not limited to, one processor. For example, the braking control apparatus 100 may include at least one processor. Each of the at least one processor may perform all operations associated with the operation.

The memory 120 may temporarily and/or permanently store various pieces of data and/or information required to perform braking control. For example, the memory 120 may store a regenerative brake torque, an output signal, a first torque at a target time point, a second torque for an amount of target braking, and a third torque at the target time point.

The first controller 130 may be an electronic control unit (ECU) or a vehicle control unit (VCU) of the vehicle. The first controller 130 may brake the vehicle depending on an output signal generated by a first pedal stroke sensor depending on a stroke of a brake pedal. The first controller 130 may apply the output signal generated by the first pedal stroke sensor to the motor to control a caliper, thus braking the vehicle.

The first controller 130 may apply an output signal of the second controller 140 and an output signal of the first controller 130 to at least one of a start-up self-test (SUST), a shut-down self-test (SDST), or fault detection logic, or any combination thereof to determine a normal state of the first controller 130. The first controller 130 may determine a result, obtained by applying the output signal of the second controller 140 and the output signal of the first controller 130 to the at least one of the SUST, the SDST, or the fault detection logic, or the any combination thereof, as a state of the first controller 130. When the state of the first controller 130 is not the normal state, the first controller 130 may transmit the state of the first controller 130 to the third controller 150 by a state signal of an external/internal CAN. For reference, the normal state of the controller may be a state indicating whether at least one of the first controller 130 or the second controller 140, or any combination thereof is able to perform hydraulic control of the vehicle.

The first controller 130 may control at least one of regenerative braking or a parking braking force, or any combination thereof to brake the vehicle, depending on whether at least one of the first controller 130 or the second controller 140 or any combination thereof is in the normal state. A detailed description of it will be described below with reference to FIGS. 6 to 7. For reference, the parking braking force may be generated by the electric parking brake (EPB) by an electrical signal.

The second controller 140 may be an electronic control unit (ECU) or a vehicle control unit (VCU) of the vehicle. The second controller 140 may brake the vehicle depending on an output signal generated by a second pedal stroke sensor different from the first pedal stroke sensor connected with the first controller 130, depending on a stroke of the brake pedal. The second controller 140 may apply the output signal generated by the second pedal stroke sensor to the motor to control a caliper, thus braking the vehicle.

The second controller 140 may apply the output signal of the first controller 130 and the output signal of the second controller 140 to the at least one of the SUST, the SDST, or the fault detection logic, or the any combination thereof to determine the normal state of the second controller 140. For example, the second controller 140 may transmit and receive an output signal with the first controller 130 using a CAN signal. The second controller 140 may determine a result, obtained by applying the output signal of the first controller 130 and the output signal of the second controller 140 to the at least one of the SUST, the SDST, or the fault detection logic, or the any combination thereof, as a state of the second controller 140. When the state of the second controller 140 is not the normal state, the second controller 140 may transmit the state of the second controller 140 to the third controller 150 by the state signal of the external/internal CAN.

The second controller 140 may control at least one of regenerative braking or a parking braking force, or any combination thereof to brake the vehicle, depending on whether at least one of the first controller 130 or the second controller 140 or any combination thereof is in the normal state. A detailed description of it will be described below with reference to FIGS. 6 to 7.

The third controller 150 may indicate a controller for calculating a regenerative brake torque for regenerative braking of the vehicle and braking the vehicle. Unlike the first controller 130 and the second controller 140, the third controller 150 is not the main braking controller (e.g., the IEB). The third controller 150 may be a controller for performing braking of the vehicle, when a fault occurs in the main braking controller (e.g., the IEB).

Figure 2:
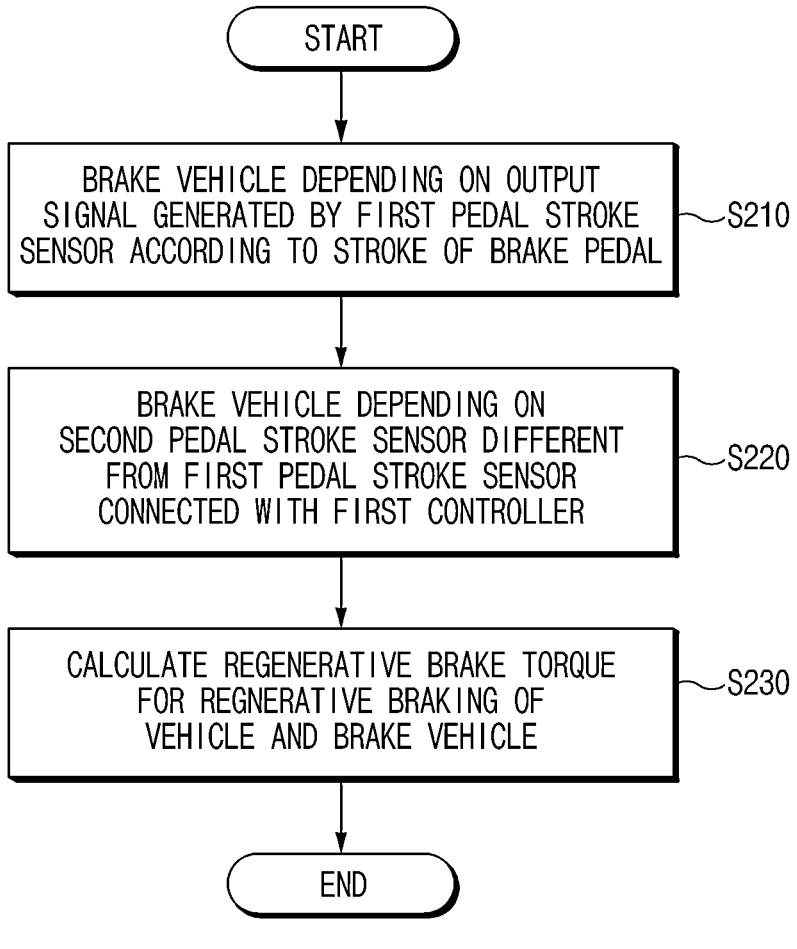
FIG. 2 is a flowchart for describing a braking control method according to an embodiment of the present disclosure.

FIG. 2 is a flowchart for describing a braking control method according to an embodiment of the present disclosure.

In S210, a braking control apparatus (e.g., a braking control apparatus 100 of FIG. 1) may brake a vehicle depending on an output signal generated by a first pedal stroke sensor depending on a stroke of a brake pedal, by a first controller (e.g., a first controller 130 of FIG. 1).

In S220, the braking control apparatus may brake the vehicle depending on an output signal generated by a second pedal stroke sensor different from the first pedal stroke sensor connected with the first controller, by a second controller (e.g., a second controller 140 of FIG. 1).

In S230, the braking control apparatus may calculate a regenerative brake torque for regenerative braking of the vehicle and may brake the vehicle, by a third controller (e.g., a third controller 150 of FIG. 1).

For reference, it is shown that S210 to S230 are be divided by an order in FIG. 2, but not limited thereto. For example, the braking control apparatus may omit S210 and may perform only the contents in S220. Therefore, FIG. 2 is an example for describing the braking control method in the specification, and the braking control method is not limited thereto.

Figure 3:
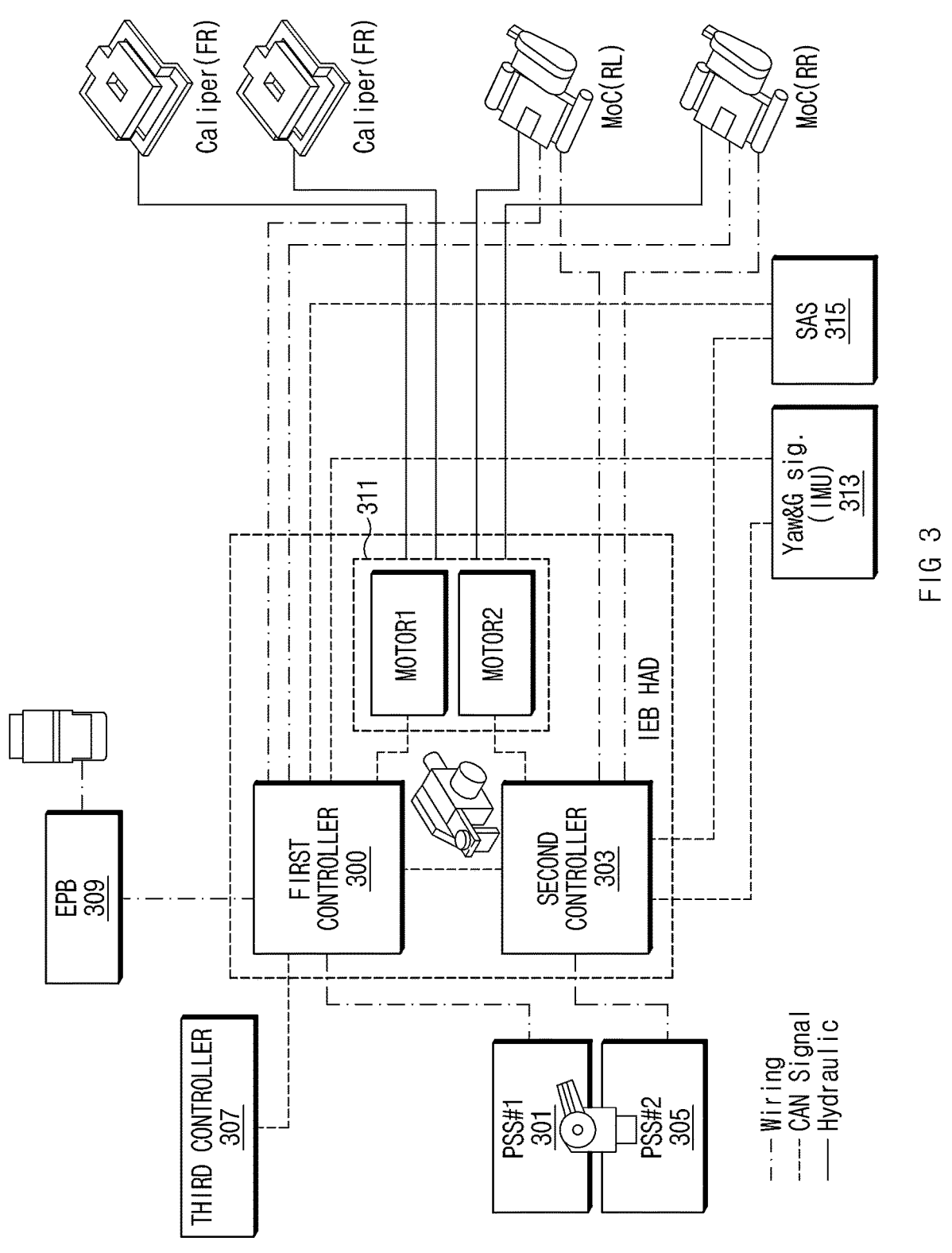
FIG. 3 is a drawing illustrating a first controller, a second controller, and a third controller, in a braking control apparatus according to an embodiment of the present disclosure.

FIG. 3 is a drawing illustrating a first controller, a second controller, and a third controller, in a braking control apparatus according to an embodiment of the present disclosure.

Referring to FIG. 3, a main braking controller (e.g., an IEB) may include a first controller 300 and a second controller 303.

The first controller 300 may be connected with the second controller 303 by a CAN signal to transmit and receive an output signal. The first controller 300 may be connected with a motor 311 included in the main braking controller (e.g., the IEB) by the CAN signal and may drive the motor 311 connected with a caliper to brake the vehicle in a hydraulic manner. The first controller 300 may drive the motor 311 connected with the caliper to brake the vehicle, depending on an output signal generated by a first pedal stroke sensor 301 according to a stroke of a brake pedal. The first controller 300 may be connected with a motor on caliper (MoC) by wiring to generate a parking braking force in the vehicle.

The first controller 300 may receive an output signal corresponding to a regenerative brake torque from a third controller 307, based on that the state of the first controller 300 is a normal state. The third controller 307 may transmit the output signal corresponding to the regenerative brake torque to the first controller 300, based on that the state of the first controller 300 is the normal state. Thereafter, the first controller 300 may compare target brake pressure with the regenerative brake torque to brake the vehicle. In detail, the first controller 300 may compare a magnitude of the target brake pressure with a magnitude of the regenerative brake torque to determine whether to brake the vehicle by using only regenerative braking or brake the vehicle by using regenerative braking and an EPB 309 together. A detailed description of it will be given below with reference to FIG. 6.

The first controller 300 may brake the vehicle by regenerative braking of the motor 311 according to the regenerative brake torque and an operation of the EPB 309, based on that the state of the first controller 300 is the normal state and that there is an error in the output signal of a first pedal stroke sensor 301. A detailed description of it will be given below with reference to FIG. 7.

The first controller 300 may be connected with each of an inertial measurement unit (IMU) 313 and a steering angle sensor (SAS) 315 by the CAN signal. For example, the IMU 313 may measure linear acceleration of the vehicle using at least one accelerometer and may measure a rotational speed of the vehicle using at least one gyroscope. The SAS 315 may measure an angle of a steering wheel of the vehicle, an angular speed of the steering wheel, and a speed of the vehicle. In detail, the SAS 315 may correct a difference between a wheel speed at an inner side and a wheel speed at an outer side, while the vehicle is turning, thus measuring the speed of the vehicle. The first controller 300 may brake the vehicle, based on the information measured by the IMU 313 and the information measured by the SAS 315.

The second controller 303 may be connected with the first controller 300 by the CAN signal to transmit and receive an output signal. The second controller 303 may be connected with the motor 311 included in the main braking controller (e.g., the IEB) by the CAN signal and may drive the motor 311 connected with the caliper to brake the vehicle in a hydraulic manner. The second controller 303 may drive the motor 311 connected with the caliper to brake the vehicle, depending on an output signal generated by a second pedal stroke sensor 305 according to a stroke of the brake pedal. The second controller 303 may be connected with a motor on caliper (MoC) by wiring to generate a parking braking force in the vehicle.

The second controller 303 may receive the output signal corresponding to the regenerative brake torque from the third controller 307, based on that the state of the first controller 300 is not the normal state and when the state of the second controller 303 is the normal state. The third controller 307 may transmit the output signal corresponding to the regenerative brake torque to the second controller 303, based on that the state of the first controller 300 is not the normal state and when the state of the second controller 303 is the normal state. In detail, the second controller 303 may compare a magnitude of the target brake pressure with a magnitude of the regenerative brake torque to determine whether to brake the vehicle by using only regenerative braking or brake the vehicle by using regenerative braking and the EPB 309 together. A detailed description of it will be given below with reference to FIG. 6.

The second controller 303 may brake the vehicle by regenerative braking of the motor 311 according to the regenerative brake torque and an operation of the EPB 309, based on that the state of the first controller 300 is not the normal state, that the state of the second controller 303 is the normal state, and that there is an error in the output signal of the second pedal stroke sensor 305. A detailed description of it will be given below with reference to FIG. 7.

The second controller 303 may be connected with each of the IMU 313 and the SAS 315 by the CAN signal. The second controller 303 may brake the vehicle, based on the information measured by the IMU 313 and the information measured by the SAS 315.

The third controller 307 may calculate a regenerative brake torque for regenerative braking of the vehicle. The third controller 307 may be connected with the first controller 300 by the CAN signal. The third controller 307 may transmit the regenerative brake torque to the first controller 300 by the CAN signal. For reference, the second controller 303 may receive the regenerative brake torque, received from the third controller 307 by the CAN signal by the first controller 300, from the first controller 300 by the CAN signal.

The third controller 307 may compare the target brake pressure with the regenerative brake torque to brake the vehicle, based on that the state of the first controller 300 is not the normal state and when the state of the second controller 303 is not the normal state. A detailed description of it will be described below with reference to FIGS. 6 to 7.

The third controller 307 may calculate a regenerative brake torque, based on vehicle speed information of the vehicle. For example, the third controller 307 may estimate vehicle speed information of the vehicle, based on the information measured by the IMU 313 and the information measured by the SAS 315. As a result, the third controller 307 may calculate a regenerative brake torque, based on the estimated vehicle speed information. However, the method for calculating the regenerative brake torque in the third controller 307 is not limited thereto. For example, the third controller 307 may estimate vehicle speed information of the vehicle, based on at least one of information measured by the IMU 313 or information measured by the SAS 315, or any combination thereof. As a result, the third controller 307 may calculate a regenerative brake torque, based on the estimated vehicle speed information.

Figure 4:
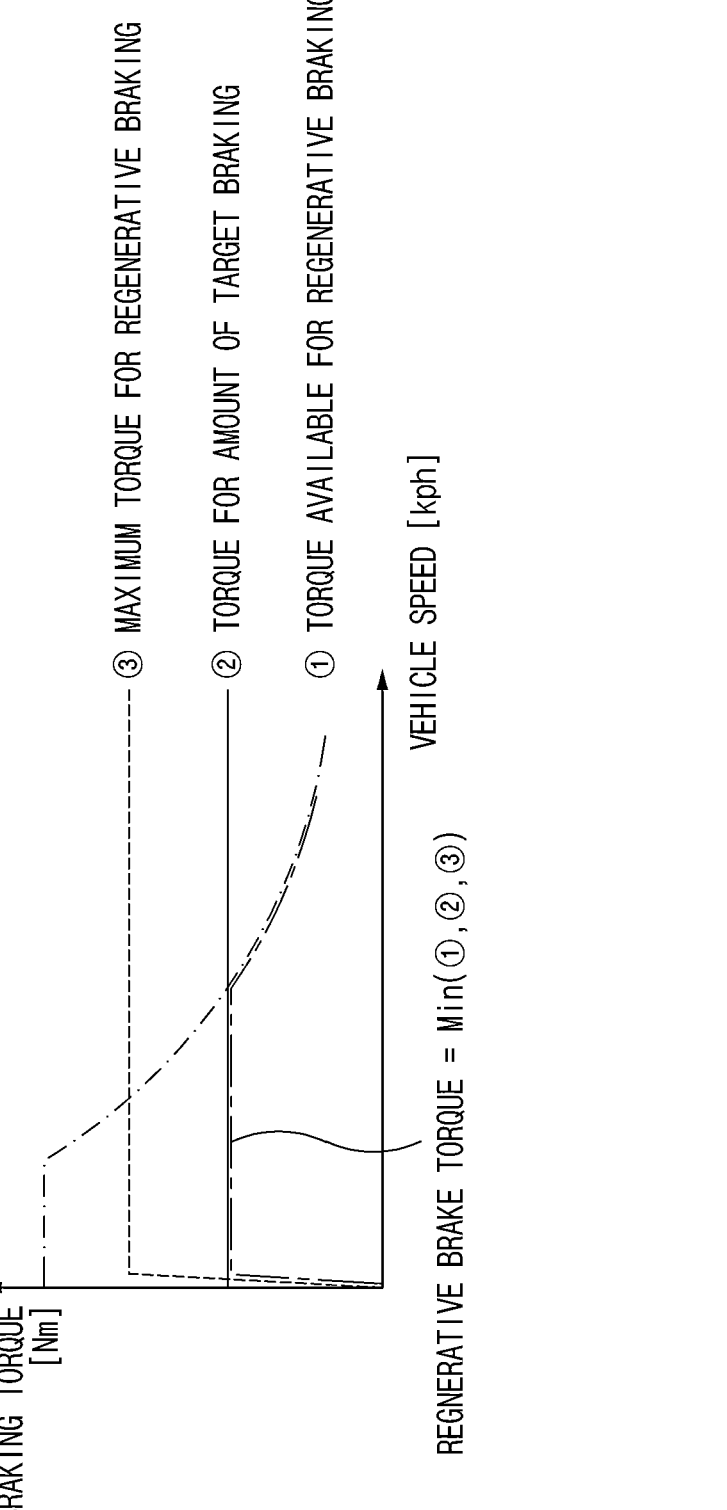
FIG. 4 is a drawing illustrating a method for calculating a regenerative brake torque in a third controller, in a braking control apparatus according to an embodiment of the present disclosure.

FIG. 4 is a drawing illustrating a method for calculating a regenerative brake torque in a third controller, in a braking control apparatus according to an embodiment of the present disclosure.

A third controller (e.g., a third controller 307 of FIG. 3) may calculate a regenerative brake torque. For example, the third controller may transmit the calculated regenerative brake torque to a first controller. The third controller may transmit the calculated regenerative brake torque to a second controller. The third controller may brake a vehicle by regenerative braking of a motor and an operation of an EPS according to the calculated regenerative brake torque. Hereinafter, a detailed method for calculating the regenerative brake torque will be described below.

First of all, referring to a graph illustrated in FIG. 4, the third controller may obtain a first torque. For example, the first torque may be a torque at a target time point in a torque area in which regenerative braking is possible (e.g., a portion illustrated as a torque available for regenerative braking on the graph) for each vehicle speed (e.g., Vehicle Speed) in the motor for driving the vehicle.

Next, referring to the graph illustrated in FIG. 4, the third controller may obtain a second torque. For example, the second torque may be a torque at the target time point in a torque area for an amount of target braking (e.g., a portion illustrated as a torque for the amount of target braking on the graph) from at least one of target brake pressure or a driving controller, or any combination thereof. For reference, the torque area for the amount of target braking may be set from target brake pressure of a driver or an amount of braking set by an autonomous driving controller (e.g., a driving controller).

Finally, referring to the graph illustrated in FIG. 4, the third controller may obtain a third torque. For example, the third torque may be a torque at the target time point in a torque area in which regenerative braking is possible to a maximum (e.g., a portion illustrated as a maximum torque for regenerative braking on the graph) for each vehicle speed in the motor.

The third controller may calculate the smallest torque among the first torque, the second torque, and the third torque as a regenerative brake torque at the target time point. However, the method for calculating the regenerative brake torque is not limited thereto. For example, the third controller may respectively apply weights to the first torque, the second torque, and the third torque and may calculate an average value of the first torque, the second torque, and the third torque to which the weights are applied as the regenerative brake torque.

Figure 5:
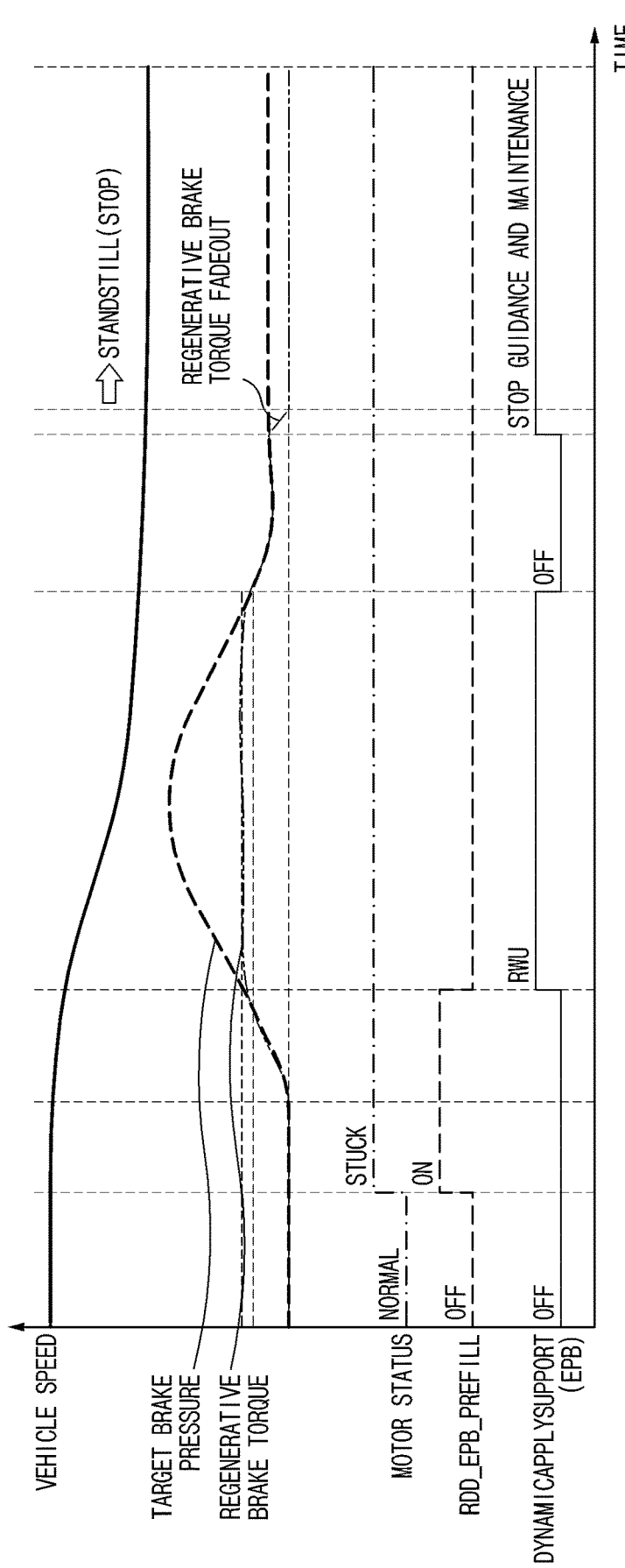
FIG. 5 is a drawing illustrating results according to a time point when braking of a vehicle is performed by regenerative braking and an electric parking brake (EPB), in a braking control apparatus according to an embodiment of the present disclosure.

FIG. 5 is a drawing illustrating results according to a time point when braking of a vehicle is performed by regenerative braking and an EPB, in a braking control apparatus according to an embodiment of the present disclosure.

In FIG. 5, the horizontal axis of a graph represents time. The vertical axis of the graph may indicate the vehicle speed, the target brake pressure, the regenerative brake torque, the motor status, the RDD_EPB_Prefill, and the degree of the EPB. For example, the graph of FIG. 5 illustrates a regenerative brake torque and an operation degree of the EPB for decelerating and stopping a vehicle from a time point when a fault (e.g., a single fault or a double fault of FIG. 1) occurs in a motor.

For example, the RDD_EPB_Prefill is turned on from a time point when the motor status is a stuck status (i.e., a fault status rather than a normal status). The RDD_EPB_Prefill may be to reduce an operation time of rear wheel unlock (RWU) of the EPB.

When the target brake pressure is greater than the regenerative brake torque, the EPB may operate. For example, the EPB may perform RWU control and may decelerate and stop the vehicle by a value obtained by subtracting the regenerative brake torque from the target brake pressure.

Furthermore, when the speed of the vehicle is less than or equal to a predetermined speed (e.g., a point at which a standstill starts), the EPB may bring the vehicle to a complete standstill. This is to bring the vehicle to the complete standstill through intervention of the EPB in a fadeout section of regenerative braking just before the standstill, because it is difficult to generate a sufficient braking force for the standstill of the vehicle by only regenerative braking when the speed of the vehicle is less than or equal to the predetermined speed. For example, a controller (e.g., a third controller) may reduce the speed of the vehicle by regenerative braking of the motor according to the regenerative brake torque and may operate the EPB to bring the vehicle to a standstill, when the speed of the vehicle is less than or equal to the predetermined speed.

Figure 6:
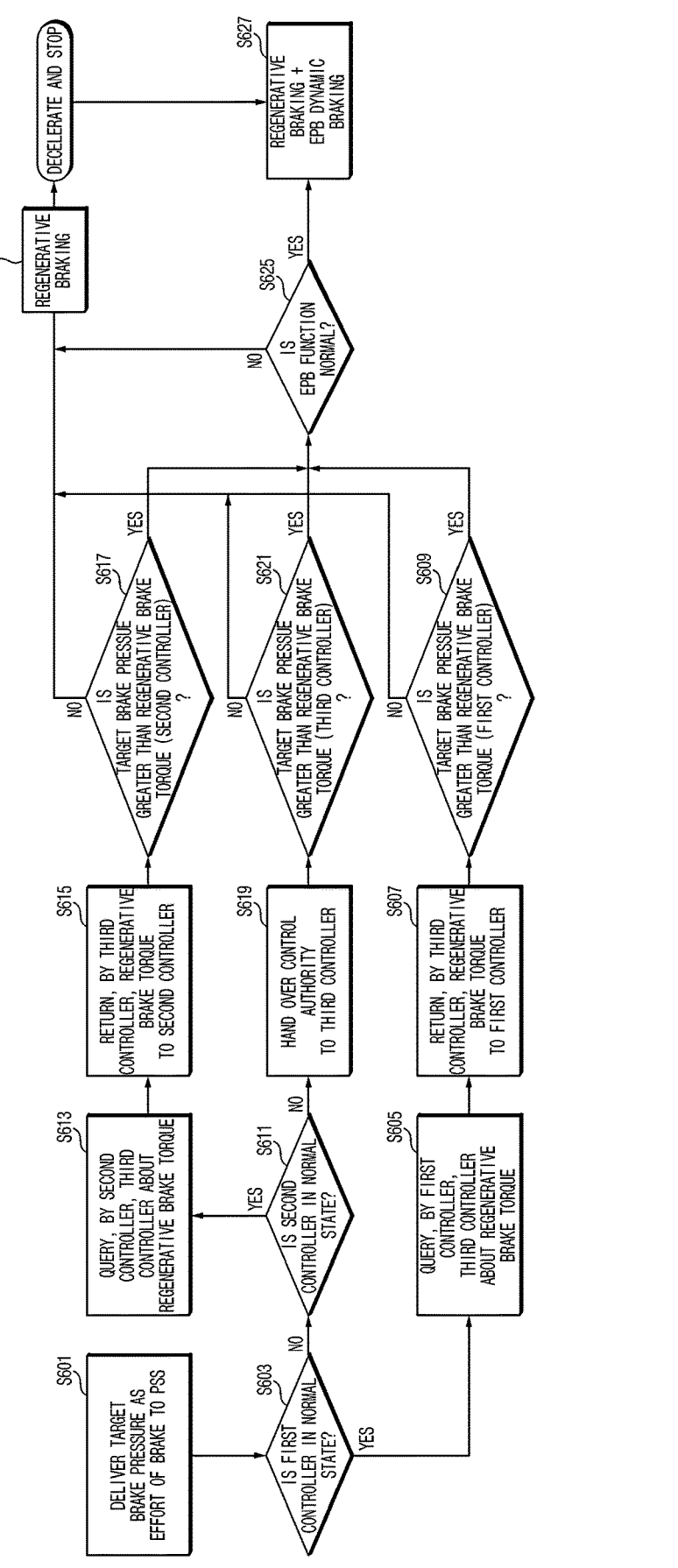
FIG. 6 is a flowchart illustrating a method for performing braking of a vehicle by regenerative braking and an EPB, in a braking control apparatus according to an embodiment of the present disclosure.

FIG. 6 is a flowchart illustrating a method for performing braking of a vehicle by regenerative braking and an EPB, in a braking control apparatus according to an embodiment of the present disclosure.

Referring to FIG. 6, FIG. 6 illustrates in detail the method for performing an operation associated with regenerative braking in first to third controllers. Therefore, hereinafter, a description will be given below of a method for braking a vehicle by regenerative braking and an EPB in the first to third controllers.

In S601, a driver may deliver target brake pressure as an effort of a brake to a PSS (e.g., a pedal stroke sensor). Furthermore, a driving controller associated with autonomous driving may deliver the target brake pressure as an effort of a virtual brake to the PSS.

In S603, the first controller may determine whether the state of the first controller is a normal state. For example, the first controller may apply an output signal of the second controller and an output signal of the first controller to at least one of SUST, SDST, or fault detection logic, or any combination thereof to determine the normal state of the first controller.

When the state of the first controller is the normal state, in S605, the first controller may query the third controller about a regenerative brake torque, in other words, the first controller may transmit and receive the regenerative brake torque by a CAN signal.

In S607, the third controller may return a regenerative brake torque calculated by the third controller for contents of the query about the regenerative brake torque received from the first controller.

In S609, the first controller may determine the target brake pressure obtained in S601 is greater than the regenerative brake torque obtained in S607 by comparing the target brake pressure obtained in S601 with the regenerative brake torque obtained in S607.

Herein, when the target brake pressure is less than the regenerative brake torque, in S623, the first controller may decelerate and stop the vehicle by regenerative braking of a motor according to the regenerative brake torque.

Otherwise, when the target brake pressure is greater than the regenerative brake torque, in S625, the first controller may determine whether a function of an EPB is normal. When the function of the EPB is not in the normal state, in S623, the first controller may decelerate and stop the vehicle by regenerative braking of the motor according to the regenerative brake torque. On the other hand, when the function of the EPB is not in the normal state, in S627, the first controller may decelerate and stop the vehicle by regenerative braking of the motor according to the regenerative brake torque and an operation of the EPB.

When the state of the first controller is not the normal state, in S611, the second controller may determine whether the state of the second controller is the normal state. For example, the second controller may apply an output signal of the first controller and an output signal of the second controller to the at least one of the SUST, the SDST, or the fault detection logic, or the any combination thereof to determine the normal state of the second controller.

When the state of the first controller is the normal state, in S613, the second controller may query the third controller about a regenerative brake torque. In other words, the second controller may transmit and receive the regenerative brake torque by the CAN signal.

In S615, the third controller may return a regenerative brake torque calculated by the third controller for contents of the query about the regenerative brake torque received from the second controller.

In S617, the first controller may determine the target brake pressure obtained in S601 is greater than the regenerative brake torque obtained in S615 by comparing the target brake pressure obtained in S601 with the regenerative brake torque obtained in S615.

Herein, when the target brake pressure is less than the regenerative brake torque, in S623, the second controller may decelerate and stop the vehicle by regenerative braking of the motor according to the regenerative brake torque.

Otherwise, when the target brake pressure is greater than the regenerative brake torque, in S625, the second controller may determine whether the function of the EPB is normal. When the function of the EPB is not in the normal state, in S623, the second controller may decelerate and stop the vehicle by regenerative braking of the motor according to the regenerative brake torque. On the other hand, when the function of the EPB is in the normal state, in S627, the second controller may decelerate and stop the vehicle by regenerative braking of the motor according to the regenerative brake torque and an operation of the EPB.

When the state of the first controller is not the normal state and when the state of the second controller is not the normal state, in S619, control authority of each of the first controller and the second controller may be handed over to the third controller.

In S621, the third controller may determine whether the target brake pressure obtained in S601 is greater than the regenerative brake torque calculated by the third controller (e.g., refer to FIG. 4) by comparing the target brake pressure obtained in S601 with the regenerative brake torque calculated by the third controller.

Herein, when the target brake pressure is less than the regenerative brake torque, in S623, the third controller may decelerate and stop the vehicle by regenerative braking of the motor according to the regenerative brake torque.

Otherwise, when the target brake pressure is greater than the regenerative brake torque, in S625, the third controller may determine whether the function of the EPB is normal. When the function of the EPB is not in the normal state, in S623, the third controller may decelerate and stop the vehicle by regenerative braking of the motor according to the regenerative brake torque. On the other hand, when the function of the EPB is in the normal state, in S627, the third controller may decelerate and stop the vehicle by regenerative braking of the motor according to the regenerative brake torque and an operation of the EPB.

FIG. 7 is a drawing illustrating a control table for each fault mode, in a robot control system according to an embodiment of the present disclosure.

Referring to the control table for each fault mode, "O" indicates that the output signal is normally output. On the other hand, "x" indicates that there is an error in the output signal. For reference, that there is the error in the output signal may include that the signal deviates from an output range, that the signal is not consecutive values, that abnormality in power supplied to the sensor is recognized, or that noise is excessively included in a sensor signal.

In the control table for each fault mode, referring to a normal state (i.e., No. 1), an entity which controls braking of a vehicle is a first controller. In this case, all of output signals of an EPB system and pedal stroke (PSS) sensors as well as a first controller and a second controller indicate a normal state. The first controller may recognize an output signal of the first PSS sensor and may perform a braking function.

In the control table for each fault mode, referring to a fault in sensor (i.e., No. 2 to No. 5), an entity which controls braking of the vehicle is the first controller or the second controller. For example, when there is an error in the output signal of the first PSS sensor and when the output signal of the second PSS sensor is normal, the second controller may recognize the output signal of the second PSS sensor and may perform a braking function.

Otherwise, when there is an error in the output signal of the second PSS sensor or when the output signal of the first PSS sensor and the output signal of the second PSS sensor are different from each other, the first controller may recognize the output signal of the first PSS sensor and may perform the braking function.

However, when there are errors in both the output signal of the first PSS sensor and the output signal of the second PSS sensor, the first controller may operate regenerative braking and the EPB system to perform emergency braking of the vehicle, without recognizing the output signal of the first PSS sensor (i.e., without performing hydraulic braking).

In the control table for each fault mode, referring to a fault in controller (i.e., No. 6 and No. 7), when there is an error in the output signal of the second controller, the first controller may recognize the output signal of the first PSS sensor and may perform the braking function. On the other hand, when there is an error in the output signal of the first controller, the second controller may recognize the output signal of the second PSS sensor and may perform the braking function.

In the control table for each fault mode, referring to a fault in PSS sensor and controller (i.e., No. 8 to No. 11), when there is an error in the output signal of the second controller and when there is an error in the output signal of the second PSS sensor, the first controller may recognize the output signal of the first PSS sensor and may perform the braking function. However, when there is an error in the output signal of the second controller and when there is an error in the output signal of the first PSS sensor, the first controller may operate regenerative braking and the EPB system to perform emergency braking of the vehicle, because it is unable to recognize the output signal of the first PSS sensor.

When there is an error in the output signal of the first controller and when there is an error in the output signal of the first PSS sensor, the second controller may recognize the output signal of the second PSS sensor and may perform a braking function. However, when there is an error in the output signal of the first controller and when there is an error in the output signal of the second PSS sensor, the second controller may operate regenerative braking and the EPB system to perform emergency braking of the vehicle, because it is unable to recognize the output signal of the second PSS signal.

In the control table for each fault mode, referring to a fault in control and a fault in EPB system (i.e., No. 12 and No. 13), the third controller may obtain control authority. For example, when there are errors in the output signals of the first controller and the second controller based on a CAN state signal received from each of the first controller and the second controller, the third controller may obtain control authority for emergency braking. Furthermore, when there is no error in the output signal of the EPB system, the third controller may operate regenerative braking and the EPB system to perform emergency braking of the vehicle. Otherwise, when there is an error in the output signal of the EPB system, the third controller may operate regenerative braking to perform emergency braking of the vehicle.

For reference, in the control table for each fault mode, for faults of No. 2 to No. 13, a braking control apparatus (e.g., a braking control apparatus 100 of FIG. 1) may turn on a warning lamp associated with a cluster of the vehicle. As a result, while transmitting a warning to the driver, the braking control apparatus may simultaneously safely control the vehicle by a predetermined control concept in a fault situation.

Figure 8:
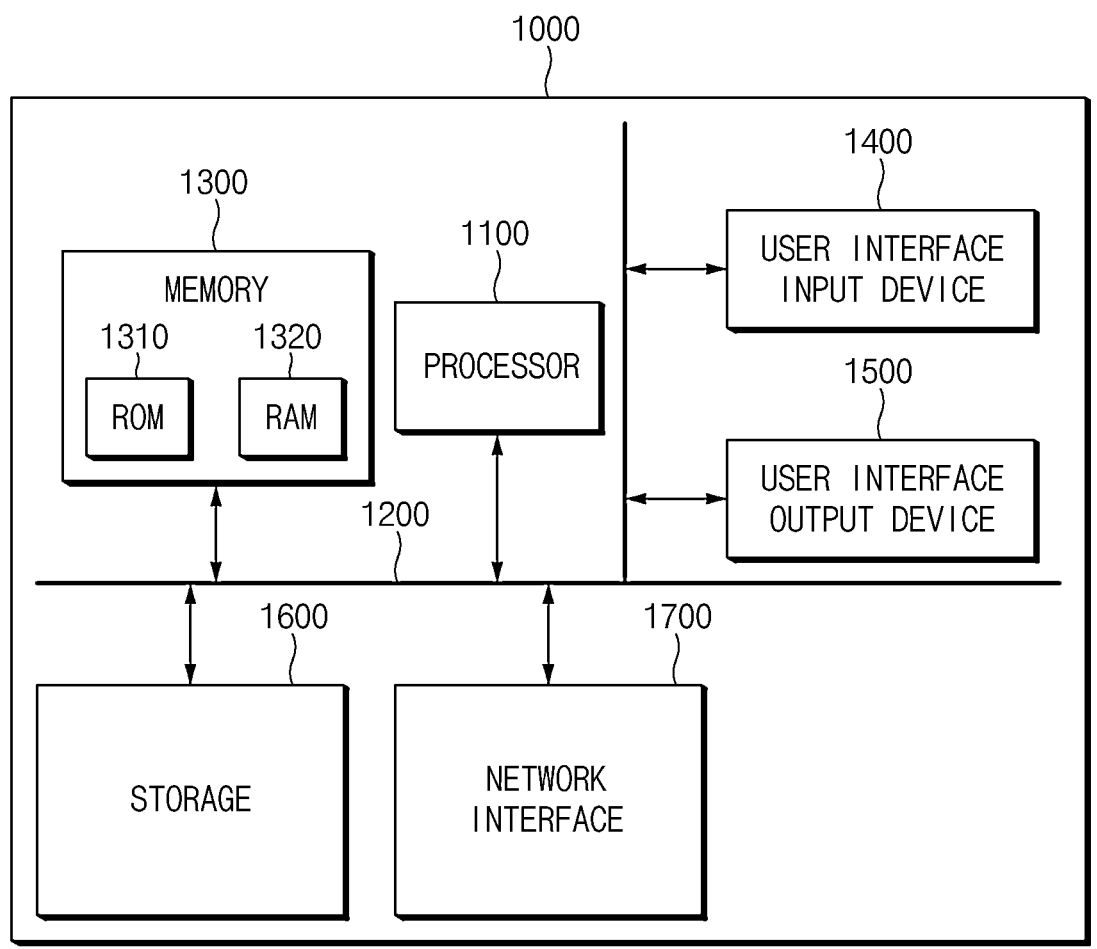
FIG. 8 is a drawing illustrating a computing system associated with a braking control apparatus and a method thereof according to an embodiment of the present disclosure.

FIG. 8 is a drawing illustrating a computing system associated with a braking control apparatus and a method thereof according to an embodiment of the present disclosure.

Referring to FIG. 8, a computing system 1000 about the braking control apparatus and the method thereof may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer hardware and/or software and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the embodiments are described with reference to restricted drawings, it may be obviously to one skilled in the art that the embodiments are variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of effects of the braking control apparatus and the method thereof according to an embodiment of the present disclosure.

According to at least one embodiments of the present disclosure, the braking control apparatus may implement a dynamic brake using regenerative braking and EPB control to supplement the amount of insufficient braking by the amount of braking of the EPB even when the target brake pressure of the driver is greater than the regenerative brake torque, thus increasing driving convenience and safety of the vehicle passenger by braking of the EPB in a regenerative braking fadeout section just before a standstill of the vehicle.

Furthermore, according to at least one embodiments of the present disclosure, the braking control apparatus and the method thereof may configure a braking redundancy system to perform braking by the remaining controllers except for a controller in which a fault occurs in an emergency situation in which braking is required, thus increasing efficiency and safety.

Furthermore, according to at least one embodiments of the present disclosure, the braking control apparatus may perform control by a third controller as a double fault occurs in a backup controller (e.g., an RCU) as well as a main braking controller (e.g., an IEB), thus more improving the sense of braking than when performing backup braking using only the EPB and stably decelerating and stopping the vehicle.

In addition, various effects ascertained directly or indirectly through the present disclosure may be provided.

Therefore, other implements, other embodiments, and equivalents to claims are within the scope of the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A braking control apparatus for a vehicle, comprising:
a first controller configured to brake the vehicle depending on an output signal generated by a first pedal stroke sensor according to a stroke of a brake pedal;
a second controller configured to brake the vehicle depending on an output signal generated by a second pedal stroke sensor different from the first pedal stroke sensor connected with the first controller;

a third controller configured to calculate a regenerative brake torque for regenerative braking of the vehicle and brake the vehicle; and
an electric parking brake (EPB) configured to generate a parking braking force of the vehicle by an electrical signal,
wherein any one of the first controller, the second controller, or the third controller is configured to control at least one of the regenerative braking or the parking braking force, depending on whether at least one of the first controller or the second controller is in a normal state,
wherein the first controller applies an output signal of the second controller and an output signal of the first controller to at least one of a start-up self-test (SUST), a shut-down self-test (SDST), or fault detection logic, to determine the normal state of the first controller and transmits a state of the first controller to the third controller, when the state of the first controller is not the normal state,
wherein the second controller applies the output signal of the first controller and the output signal of the second controller to the at least one of the SUST, the SDST, or the fault detection logic, to determine the normal state of the second controller and transmits a state of the second controller to the third controller, when the state of the second controller is not the normal state, and
wherein the normal state indicates whether the at least one of the first controller or the second controller is able to perform hydraulic control of the vehicle.

2. The braking control apparatus of claim 1, wherein the third controller obtains a first torque at a target time point, in a torque area in which regenerative braking is possible for each vehicle speed, in a motor for driving the vehicle, obtains a second torque for an amount of target braking from at least one of target brake pressure or a driving controller, obtains a third torque for the target time point, in a torque area in which regenerative braking is possible to a maximum for each vehicle speed, in the motor, and calculates the smallest torque among the first torque, the second torque, and the third torque as the regenerative brake torque at the target time point.

3. The braking control apparatus of claim 1, wherein the first controller receives an output signal corresponding to the regenerative brake torque from the third controller, based on that a state of the first controller is the normal state, and compares target brake pressure with the regenerative brake torque and brakes the vehicle, and
wherein the third controller transmits the output signal corresponding to the regenerative brake torque to the first controller, based on that the state of the first controller is the normal state.

4. The braking control apparatus of claim 3, wherein the first controller brakes the vehicle by regenerative braking of a motor according to the regenerative brake torque and an operation of the EPB, based on that the state of the first controller is the normal state and that there is an error in the output signal of the first pedal stroke sensor.

5. The braking control apparatus of claim 1, wherein the second controller receives an output signal corresponding to the regenerative brake torque from the third controller, based on that a state of the first controller is not the normal state and that a state of the second controller is the normal state, and compares target brake pressure with the regenerative brake torque and brakes the vehicle, and
wherein the third controller transmits the output signal corresponding to the regenerative brake torque to the second controller, based on that the state of the first controller is not the normal state and that the state of the second controller is the normal state.

6. The braking control apparatus of claim 5, wherein the second controller brakes the vehicle by regenerative braking of a motor according to the regenerative brake torque and an operation of the EPB, based on that the state of the first controller is not the normal state, that the state of the second controller is the normal state, and that there is an error in the output signal of the second pedal stroke sensor.

7. The braking control apparatus of claim 1, wherein the third controller compares target brake pressure with the regenerative brake torque and brakes the vehicle, based on that a state of the first controller is not the normal state and that a state of the second controller is not the normal state.

8. The braking control apparatus of claim 1, wherein at least one of the first controller, the second controller, or the third controller obtains a state of the EPB, when target brake pressure is greater than the regenerative brake torque, and brakes the vehicle by regenerative braking of a motor according to the regenerative brake torque and an operation of the EPB, when the state of the EPB is normal.

9. The braking control apparatus of claim 1, wherein the third controller reduces a speed of the vehicle by regenerative braking of a motor according to the regenerative brake torque, based on a controller area network (CAN) state signal received from each of the first controller and the second controller, and operates the EPB to bring the vehicle to a standstill, when the speed of the vehicle is less than or equal to a predetermined speed.

10. A braking control method for a vehicle, comprising:
    braking, by a first controller, the vehicle depending on an output signal generated by a first pedal stroke sensor according to a stroke of a brake pedal;
    braking, by a second controller, the vehicle depending on an output signal generated by a second pedal stroke sensor different from the first pedal stroke sensor connected with the first controller;
    calculating, by a third controller, a regenerative brake torque for regenerative braking of the vehicle and braking, by the third controller, the vehicle;
    generating, by an electric parking brake (EPB), a parking braking force of the vehicle by an electrical signal;
    controlling, by any one of the first controller, the second controller, or the third controller, at least one of the regenerative braking or the parking braking force to brake the vehicle, depending on whether at least one of the first controller or the second controller, is in a normal state;
    applying, by the first controller, an output signal of the second controller and an output signal of the first controller to at least one of a start-up self-test (SUST), a shut-down self-test (SDST), or fault detection logic, to determine the normal state of the first controller;
    transmitting, by the first controller, a state of the first controller to the third controller, when the state of the first controller is not the normal state;
    applying, by the second controller, the output signal of the first controller and the output signal of the second controller to the at least one of the SUST, the SDST, or the fault detection logic to determine the normal state of the second controller; and
    transmitting, by the second controller, a state of the second controller to the third controller, when the state of the second controller is not the normal state, wherein the normal state indicates whether the at least one of the first controller or the second controller is able to perform hydraulic control of the vehicle.

11. The braking control method of claim 10, further comprising:
    obtaining, by the third controller, a first torque at a target time point, in a torque area in which regenerative braking is possible for each vehicle speed, in a motor for driving the vehicle;
    obtaining, by the third controller, a second torque for an amount of target braking from at least one of target brake pressure or a driving controller;
    obtaining, by the third controller, a third torque at the target time point, in a torque area in which regenerative braking is possible to a maximum for each vehicle speed, in the motor; and
    calculating, by the third controller, the smallest torque among the first torque, the second torque, and the third torque as the regenerative brake torque at the target time point.

12. The braking control method of claim 10, further comprising:
    receiving, by the first controller, an output signal corresponding to the regenerative brake torque from the third controller, based on that a state of the first controller is the normal state;
    comparing, by the first controller, target brake pressure with the regenerative brake torque and braking, by the first controller, the vehicle; and
    transmitting, by the third controller, the output signal corresponding to the regenerative brake torque to the first controller, based on that the state of the first controller is the normal state.

13. The braking control method of claim 12, wherein the braking of the vehicle includes:
    braking, by the first controller, the vehicle by regenerative braking of a motor according to the regenerative brake torque and an operation of the EPB, based on that the state of the first controller is the normal state and that there is an error in the output signal of the first pedal stroke sensor.

14. The braking control method of claim 10, further comprising:
    receiving, by the second controller, an output signal corresponding to the regenerative brake torque from the third controller, based on that a state of the first controller is not the normal state and that a state of the second controller is the normal state;
    comparing, by the second controller, target brake pressure with the regenerative brake torque and braking, by the second controller, the vehicle; and
    transmitting, by the third controller, the output signal corresponding to the regenerative brake torque to the second controller, based on that the state of the first controller is not the normal state and that the state of the second controller is the normal state.

15. The braking control method of claim 14, wherein the braking of the vehicle includes:
    braking, by the second controller, the vehicle by regenerative braking of a motor according to the regenerative brake torque and an operation of the EPB, based on that the state of the first controller is not the normal state, that the state of the second controller is the normal state, and that there is an error in the output signal of the second pedal stroke sensor.

16. The braking control method of claim 10, further comprising:

comparing, by the third controller, target brake pressure with the regenerative brake torque and braking, by the third controller, the vehicle, based on that a state of the first controller is not the normal state and that a state of the second controller is not the normal state.

17. The braking control method of claim 16, wherein the braking of the vehicle includes:

reducing, by the third controller, a speed of the vehicle by regenerative braking of a motor according to the regenerative brake torque, based on a CAN state signal received from each of the first controller and the second controller; and operating, by the third controller, the EPB to bring the vehicle to a standstill, when the speed of the vehicle is less than or equal to a predetermined speed.

18. The braking control method of claim 10, further comprising:

obtaining, by at least one of the first controller, the second controller, or the third controller, a state of the EPB, when target brake pressure is greater than the regenerative brake torque; and braking, by the at least one of the first controller, the second controller, or the third controller, the vehicle by regenerative braking of a motor according to the regenerative brake torque and an operation of the EPB, when the state of the EPB is normal.

\* \* \* \* \*